United States Patent [19]

Kotchey

[11] Patent Number: 5,812,135
[45] Date of Patent: Sep. 22, 1998

[54] REORGANIZATION OF NODES IN A PARTIAL VIEW OF HIERARCHICAL INFORMATION

[75] Inventor: Christopher Michael Kotchey, Apalachin, N.Y.

[73] Assignee: International Business Machines Corporation, Armonk, N.Y.

[21] Appl. No.: 744,522

[22] Filed: Nov. 5, 1996

[51] Int. Cl.[6] .................................................. G06F 17/30
[52] U.S. Cl. ........................................ 345/356; 707/100
[58] Field of Search ................................... 345/356, 341, 345/340, 355, 357; 707/3–6, 100

[56] References Cited

U.S. PATENT DOCUMENTS

| 5,185,885 | 2/1993 | Dysart et al. | 395/600 |
| 5,230,072 | 7/1993 | Smith et al. | 395/600 |
| 5,237,656 | 8/1993 | Shackelford et al. | 395/160 |
| 5,262,761 | 11/1993 | Scandura et al. | 340/133 |
| 5,291,595 | 3/1994 | Martins | 395/600 |
| 5,295,243 | 3/1994 | Robertson et al. | 345/348 |
| 5,305,435 | 4/1994 | Bronson | 395/159 |
| 5,317,732 | 5/1994 | Gerlach et al. | 395/600 |
| 5,333,254 | 7/1994 | Robertson | 345/356 |
| 5,355,317 | 10/1994 | Talbott | 384/468 |
| 5,369,763 | 11/1994 | Biles | 395/600 |
| 5,390,295 | 2/1995 | Bates et al. | 395/157 |
| 5,394,521 | 2/1995 | Henderson et al. | 395/158 |

FOREIGN PATENT DOCUMENTS

| 622728 | 11/1994 | European Pat. Off. . |
| 63226723 | 9/1988 | Japan . |
| 05307476 | 11/1993 | Japan . |

OTHER PUBLICATIONS

"Cone Trees: Animated 3D Visualizations of Hierarchical Information," Robertson et al., Proceedings of the 1991 Conference on Humna Factor in Computing Systems, pp. 189–194, ACM, New York, NY, USA, Apr. 1991.

"Manipulating and Documenting Software Structures Using SHriMP Views," Storey et al., Proceedings of the 1995 IEEE Conference on Software Maintenance, pp. 275–285, IEEE, Oct. 1995.

"Automatic Icon Resizing Method Upon Parent Window Resizing". Research Disclosure 311044–A. 90.03.10. WPAT Abstract.

Johnson. "Enhancing Scrollable Output Fields for Increased Usability". IBM Technical Disclosure Bulletin (TDB), v.37, n.12 (Dec. 1994) pp. 453–456.

Fitzpatrick. "Dynamic Icon Presentation". IBM TDB, v. 35, n. 4b (Sep. 1992), pp. 227–232.

Jaaskelainen. "Hierarchical Folders for Storing Data". IBM TDB, v. 31, n.8 (Jan. 1989), pp. 32–39.

Stevens. "Network and Operating System Support . . . ". Second International Workshop Proceedings, Springer–Verlag. (1992) pp. 197–208. INSM abstract.

Slough. "Functional Specifications of a Hierarchical File System", Proc of the 15th Hawaii Intl Conf on Sys Sciences. Wash State Univ, Jan. 1982, v.1, pp. 210–217. INSM abstract.

Bright. "Graphical User Interface for Managing Complex Object Trees." IBM TDB, v.34, n.11 (Apr. 1992), pp. 387–389.

Henshaw. "Slide–Attachments of Secondary or Tool Palette Windows." IBM TDB, v. 37, n.4A (Apr. 1994), pp. 405–408.

Pullin, et al. "Method for Accessing Hierarchical Views of a Binary Relational Database." IBM Technical Disclosure Bulletin, V. 26, N. 5, Oct. 1983, pp. 2557–2559.

*Primary Examiner*—Thomas G. Black
*Assistant Examiner*—Hosain T. Alam
*Attorney, Agent, or Firm*—Shelley M. Beckstrand

[57] ABSTRACT

A method for rearranging the partially displayed nodes of an information hierarchy such that the lineage of displayed nodes is shown up through the root node of the hierarchy.

15 Claims, 5 Drawing Sheets

REORGANIZATION OF NODES IN A PARTIAL VIEW OF HIERARCHICAL INFORMATION

BACKGROUND OF THE INVENTION

1. Technical Field of the Invention

This invention pertains to a method for maximizing an amount of related information displayed on a computer screen. In particular, this invention optimizes the display of file hierarchy information displayed to a computer user, thereby providing more efficient information access and avoiding time consuming scrolling to view available information.

2. Background Art

When hierarchical information is displayed on a computer screen, or within a window on a computer screen, it is very common that the display area is not large enough to display the entire contents of the hierarchy, i.e., from the source node, or root directory, down to the last folder or file within the tree. When the view of the hierarchy is shifted or scrolled to include lower branches of the hierarchy, many implementations display the information in such a way that it is not obvious from the amount of information visible what is the parentage of the visible nodes. Often, the nodes, directory names, or filenames scroll past the top of the display screen and are no longer visible.

This invention describes a method whereby the view of a hierarchy is dynamically altered in such a way that the content and information portrayed by the hierarchy is selectively controllable, in order to display to the user the parentage of any node, file, or directory visible in the display area without encountering any of the problems associated with a limited view of the node hierarchy.

A HIERARCHY is a method of data organization and a type of data structure for storing data. A piece of information in a hierarchy is represented by a NODE. In a typical PC implementation for organizing file data, it is usually referred to as a file, folder, or directory, and may contain applications, programs, text, more files, or any other type of data. Each node in the hierarchy may have zero or more CHILDREN. The same node is referred to as the PARENT of the nodes that are its children. The parents of the parent (and so on, up to a root node) of a given node are referred to as ANCESTORS. Similarly, children of a child (and so on, down to a childless node) of a given node are referred to as DESCENDANTS. A given node can be both a child of another node, and have children of its own. A single node in a hierarchy that has no parent is called the ROOT, however, not every hierarchy structure traces all its nodes to a single root node, that is, a hierarchy structure may contain several parentless nodes. Nodes in a hierarchy that share the same parent are called SIBLINGS. Nodes that are at the same LEVEL in a hierarchy are those that have the same number of ancestors.

FIG. 1 illustrates a hierarchy of information. In FIG. 1, node A1 is the root. Groups of siblings include {B1, B2, B3, B4, B5, B6, B7}, {C1, C2, C3}, {C4, C5}, {D1, D2, D3}, and (D5, D6). Nodes A1, C6, and D4 have no siblings. Nodes C1, C2, and C3 are examples of children of B2, which is conversely the parent of nodes C1, C2, and C3. Node B6 is the parent of node C5, while A1 is C5's ancestor. The children of B6 are nodes C4 and C5, while its descendants are D4, D5, and D6. In this illustration, nodes at a common level are labeled with the same letter.

Information within a hierarchy such as FIG. 1 is typically represented on a computer screen in a manner as illustrated, for example, in FIG. 2. In such a view of a hierarchy, vertical and horizontal connecting lines are often used to connect parent nodes with their children. Indentation of nodes is directly related to the number of levels from the root. Thus, nodes at a given level are indented the same amount, with nodes at lower levels (levels with more ancestors) being indented more than higher levels. Such a hierarchy preserves the order of siblings beneath a parent, does not allow lines to cross within the display, and does not allow more than one node to be displayed within the same horizontal space. These rules make it possible to display the nodes and understand their interrelationships without using the connecting lines, however, they are often used for clarity.

Typically, in a DOS implementation, for example, a target file must be accessed by identifying its pathname, that is, every ancestor from the root node to the parent of the target file, and finally, the target file itself must be listed. A common format for such a pathname is as follows:

C:\directory\subdirectory\folder\filename.bat where "C" (the storage device) can be considered as the root node. Often, information within children of a particular parent node must be accessed through the parent since the children are only identifiable as members of the parent node.

FIG. 10 illustrates a PC computer system 101 with a display 104 for displaying a hierarchy of nodes. The file system is typically managed by the operating system OS and the information displayed in the hierarchy is usually stored in a permanent storage device 102 or in RAM 103. The files, applications (APP1, APP2), and directories stored in the PC system storage 102, 103 can be efficiently displayed in a hierarchical manner.

In many situations, the amount of information in an extensive hierarchy to be displayed is too large to fit within the display area on a computer screen. In such a situation, only a portion of the hierarchy can be displayed at any given time. The problem encountered with a limited display area is illustrated in FIG. 3. In this view, the bottom-most portion of the hierarchy in FIG. 2 is correctly displayed. However, given the limited view of the hierarchy, the user cannot identify which nodes are the parents and ancestors of the displayed nodes. To determine this information, the user would be required to scroll the display up the hierarchy, following the connecting lines, to locate the desired ancestors, after which, the descendant nodes are no longer visible.

It is, therefore, an object of the invention to provide more information to a computer user within the limits of a computer screen.

It is another object of the invention to avoid the necessity of scrolling for more information to be displayed on a computer screen.

It is yet another object of the invention to efficiently display the hierarchical relationship of files or nodes within one display screen.

Other features and advantages of this invention will become apparent from the following detailed description of the presently preferred embodiment of the invention, taken in conjunction with the accompanying drawings.

SUMMARY OF THE INVENTION

In accordance with this invention, a method for is provided for operating a computing apparatus to rearrange nodes of an information hierarchy within a single display area insufficient in size to display the complete hierarchy of nodes such that the lineage of displayed nodes is shown up through the root node of the hierarchy, including the steps of selecting a node from the hierarchy, identifying parents and ancestors of the selected node, and displaying the selected node together with its parents and ancestors in the single display area.

BEST MODE FOR CARRYING OUT THE INVENTION

The following describes one implementation of the invention. A specific reorganization of a hierarchy within a display is described, and in connection with the pseudo-code of Table 1, one specific method by which this goal has been achieved.

The invention provides a method for optimizing an amount of information shown on a display to a computer user. The method involves a rearrangement of nodes or data items arranged in a data structure which is only partially viewable due to a limited screen or display area. The user can select a particular node or data item for which parental lineage information is desired (parents and ancestors of a node, or other data items linked to the selected data item). Alternatively, a computer system may automatically display parental lineage information for displayed nodes whose entire lineage is not visible. Once the parental information, or linked data, is searched and obtained, the selected node or item is simultaneously displayed with the parental lineage in a manner similar to the original display of the data structure or in a list. Previously visible nodes or data items may need to be shifted or removed from the display area to make room for the rearranged display of nodes.

The partial view of a hierarchy is altered dynamically in such a way that the non-visible parents and ancestors of the visible nodes are shifted downward into the display area. Alternatively, parents and ancestors only of selected nodes are inserted into the display area. With the ancestor nodes relocated into the visible display area, the parentage of the descendant nodes can be clearly seen without requiring the user to reposition, or scroll, the view of the hierarchy.

Figure 3:
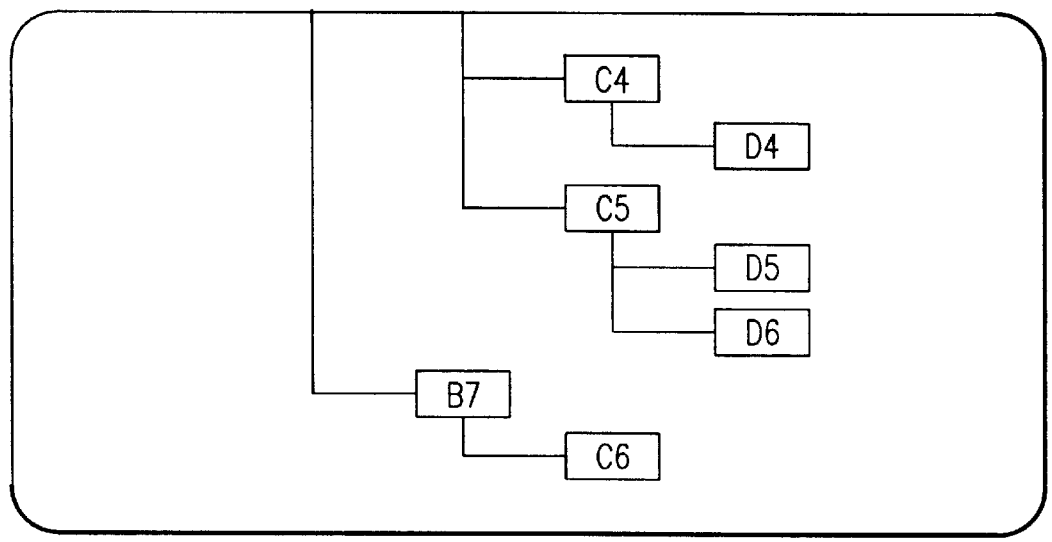
FIG. 3 illustrates a partial view of a hierarchy within a limited display space.
Figure 4:
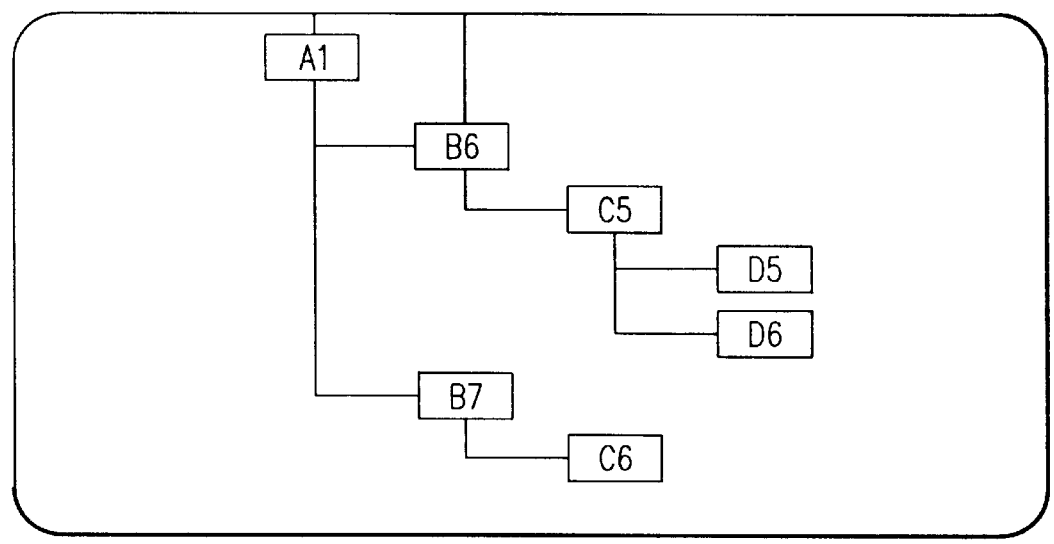
FIG. 4 illustrates the view of FIG. 3 with the inventive implementation.
Figure 5:
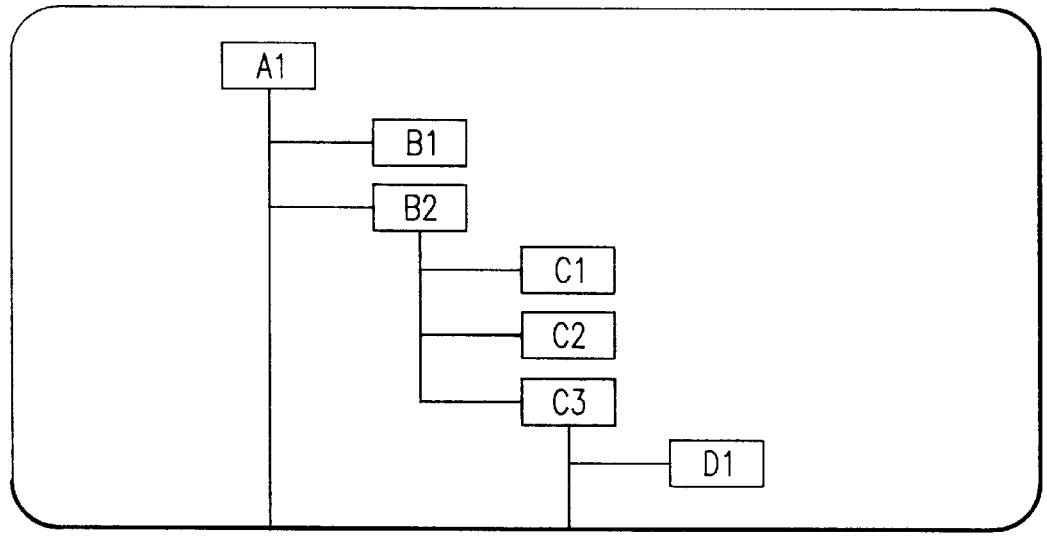
FIG. 5 illustrates a view of the hierarchy of FIG. 2 through node D1.

FIG. 4 illustrates how the partial view of the hierarchy illustrated in FIG. 3 is dynamically altered to display the parentage information that was not visible for nodes C5 and B7. In this illustration, nodes C4 and D4 are shifted up out of the viewable area, and nodes A1 and B6 are shifted down in the viewable area in such a way that the hierarchical information for C5 and B7 is displayed, while also maintaining the indentation of nodes at the same level. Note that in these displays there are enough horizontal spaces to display seven nodes. This number may vary depending on the computer system software platform and hardware used to store and display information.

TABLE 1

Pseudocode example:

```
main loop:
    select the last node visible in display area
    while (more room available in display area)
        Select the parent of the most recently
        selected mode
    endwhile
    for each parent selected in the loop above (in
    the same order)
        AND while (more room available in display
        area)
            call select(this node)
    endfor
    display selected nodes in their proper order
select(node):
    while ((unselected child exists under this
    node)
        AND (more room available))
        Select the last unselected child of this
        node
        if (more room is available in display
        area)
            call select (node just selected)
        else
            jump out of while loop
        endif
    endwhile
```

In the pseudocode of Table 1, the information to be displayed within the viewable region is dependent upon the last piece of information that is to be placed in the display, i.e., at the bottom of the viewable region. In the event that the display area is not large enough to display all parentage information about a given node, as much of this information is displayed as possible. It is noted that if a particular hierarchy to be displayed includes seven levels, then the lineage from a lowest level node to a root node will require all the space in a display area if the display area includes only seven horizontal spaces, as in the examples used herein.

Figure 1:
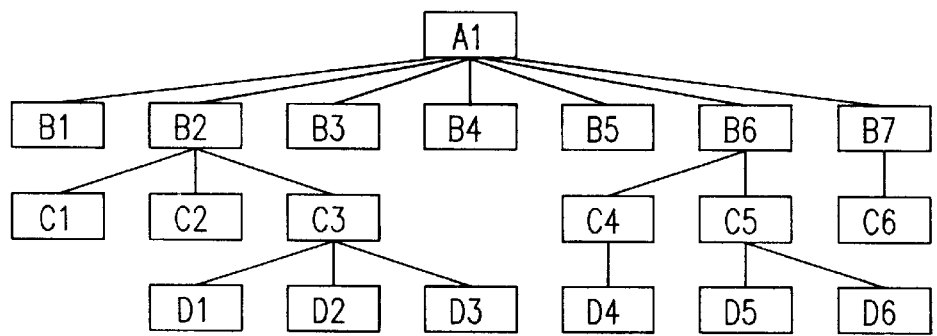
FIG. 1 illustrates the use of a hierarchy to represent and display organized information.
Figure 2:
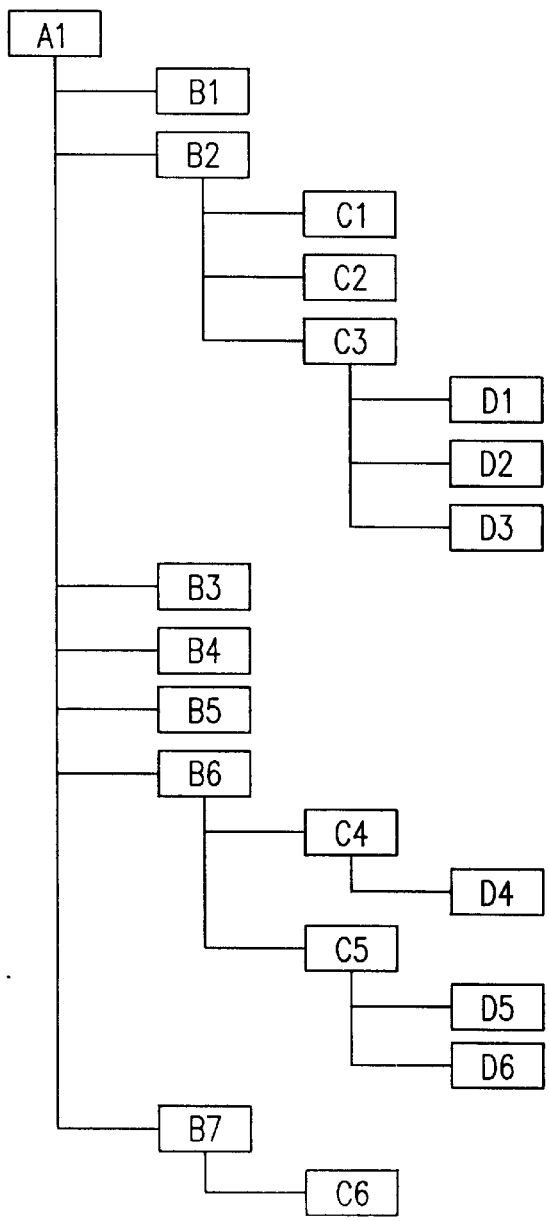
FIG. 2 illustrates a another view of a hierarchy to represent and display organized information.
Figure 6:
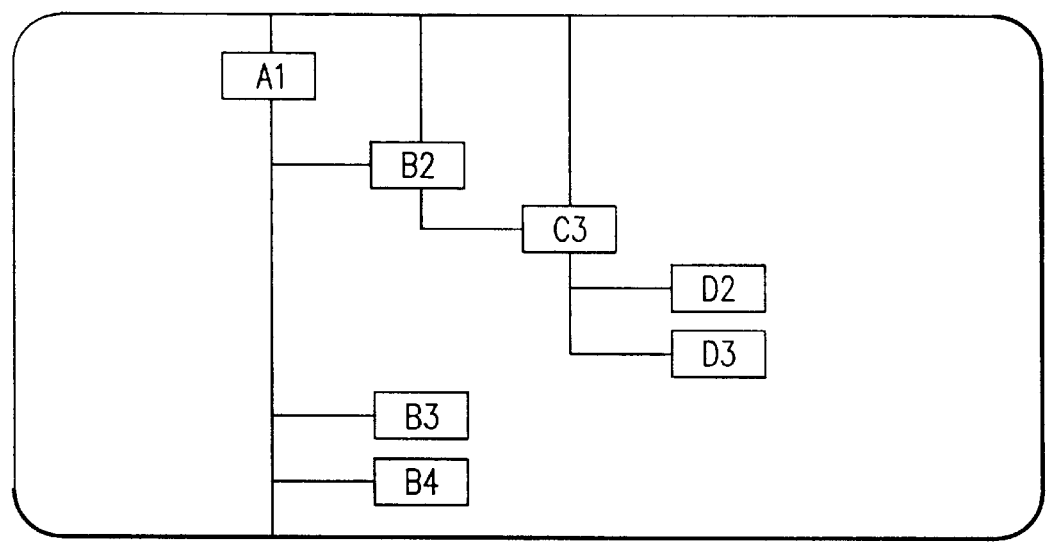
FIG. 6 illustrates a view of the hierarchy of FIG. 2 through node B4.

Using the hierarchy illustrated in FIG. 2, the following description will illustrate how the display is altered when the viewing area is large enough to include 7 nodes with node B4 as the last displayed node. The resulting view is illustrated in FIG. 6.

With reference to the preceding pseudocode, Node B4 is selected for placement within the display. Parent node A1 is selected for placement within the display because it is the one and only parent of node B4. Calling select() with node A1, the following nodes are selected in the following order until we have selected the seven nodes that can fit within the display: B3, B2, C3, D3, and finally D2. Having selected seven nodes, the loop completes.

The selected nodes are placed on the screen in the same order in which they appear in the hierarchy of FIG. 2, and in the appropriate "column", i.e., appropriately indented, according to the level at which each node resides.

The displayed nodes are connected via appropriate lines to their parents. Vertical lines are extended upward if additional children exist previous to those nodes displayed, and downward if additional children exist following those nodes displayed. The result of implementing the invention is displayed in FIG. 6.

Figure 7:
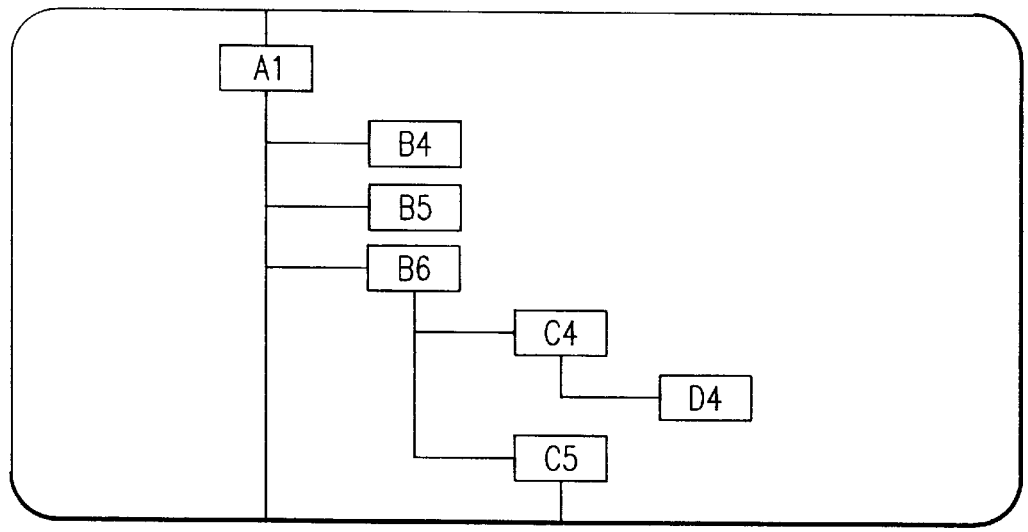
FIG. 7 illustrates a view of the hierarchy of FIG. 2 through node C5.

Using the hierarchy illustrated in FIG. 2, the following description will illustrate, according to the preceding pseudocode, how the display is altered when the viewing area is large enough to include 7 nodes with node C5 selected, for example, by a highlighting with a cursor or by clicking a pointing device, as the last displayed node. The resulting tree view of the hierarchy provided by the invention is illustrated in FIG. 7.

Node C5 is selected for placement within the display. Nodes B6 and A1 are selected for placement in the display because they are the parent and ancestor (respectively) of node C5. Starting with parent node B6, it's last child C4 is selected, then C4's last child D4 is selected. A1's next last child, B5, is then selected. A1's next last child, B4, is then selected. At this point, seven nodes have been selected for display and the loop completes.

The selected nodes are placed on the screen in the same order in which they appear in the hierarchy of FIG. 2, and in the appropriate "column" according to the level at which each node resides.

The displayed nodes are connected via appropriate lines to their parents. Vertical lines are extended upward if additional children exist previous to those displayed, and downward if additional children exist following those displayed.

By following an algorithm such as the one described above, portions of a hierarchy of information can be displayed in such a way that the parentage of selected nodes in the display is not hidden from view due to the restrictions of the amount of space available on the display. Nodes within the hierarchy are "rearranged" for display to accomplish this goal.

Using the pseudocode listed above, the following list representations would be generated and displayed assuming a hierarchy as shown in FIG. 2, and a display area large enough to include 7 nodes. Alternatively, these lists of node names themselves could be displayed to the user instead of within the hierarchical structure of nodes.

| Last Node Displayed | Nodes Visible (in order selected) |
| --- | --- |
| D2 | C3, B2, A1, D1, C2, C1 |
| D3 | C3, B2, A1, D2, D1, C2 |
| B3 | A1, B2, C3, D3, D2, D1 |
| B5 | A1, B4, B3, B2, C3, D3 |
| B6 | A2, B5, B4, B3, B2, C3 |
| C4 | B6, A1, B5, B4, B3, B2 |
| D4 | C4, B6, A1, B5, B4, B3 |
| D5 | C5, B6, A1, C4, D4, B5 |
| D6 | C5, B6, A1, D5, C4, D4 |
| B7 | A1, B6, C5, D6, D5, C4 |

Alternative Embodiments

It will be appreciated that, although specific embodiments of the invention have been described herein for purposes of illustration, various modifications may be made without departing from the spirit and scope of the invention. In particular, using algorithms other than the one described in the pseudocode above, one can accomplish a similar result in a hierarchy that is different in many ways.

In accordance with yet further alternatives, more than one node can be displayed on a line (to increase from seven to some larger number the number of nodes displayed in the seven line examples previously described.) In one such alternative, sibling nodes may be displayed on the same line. Similarly, the indentation of nodes may be varied.

Figure 8:
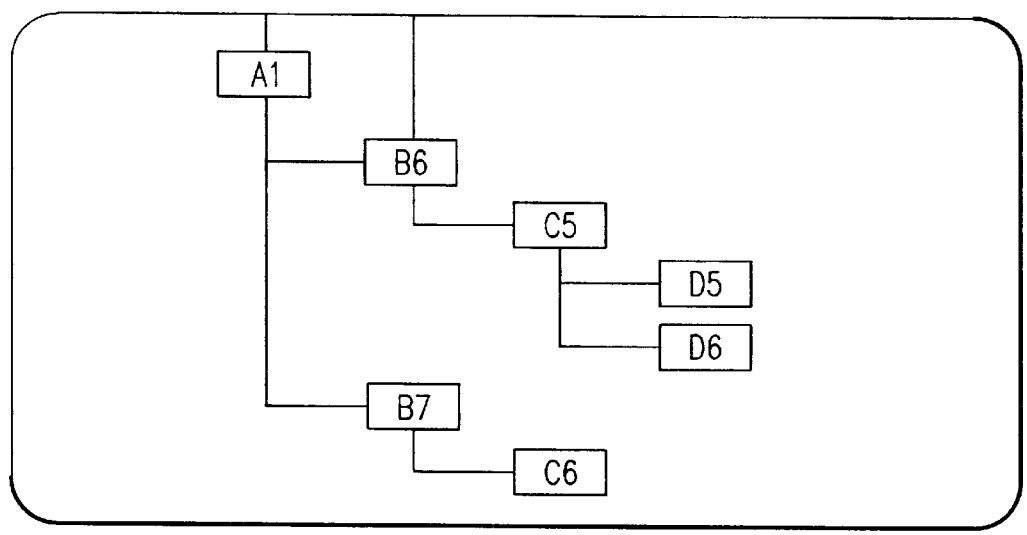
FIG. 8 illustrates a view of the hierarchy of FIG. 2 through node C6.
Figure 9:
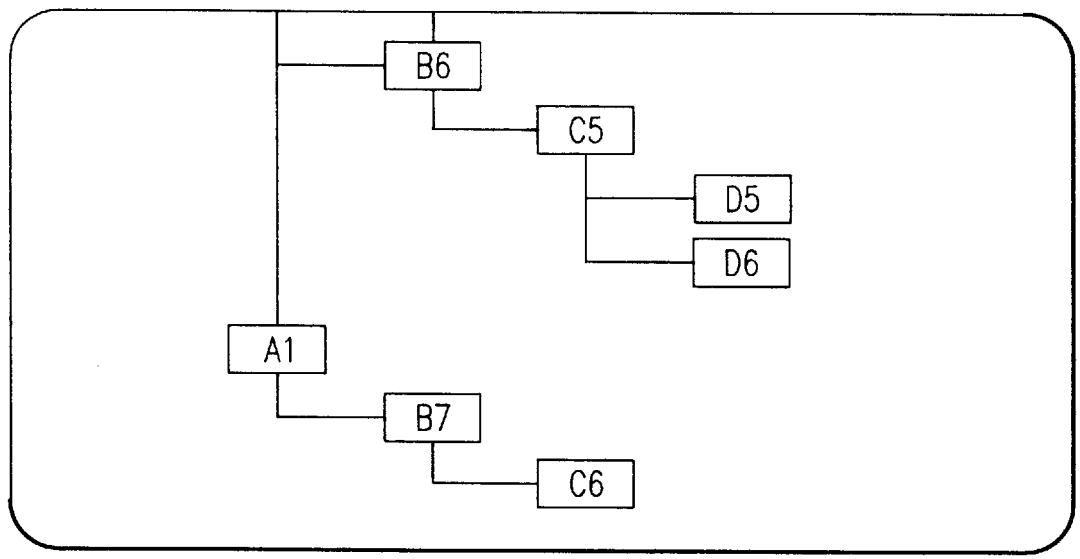
FIG. 9 illustrates an alternative implementation of the invention.
Figure 10:
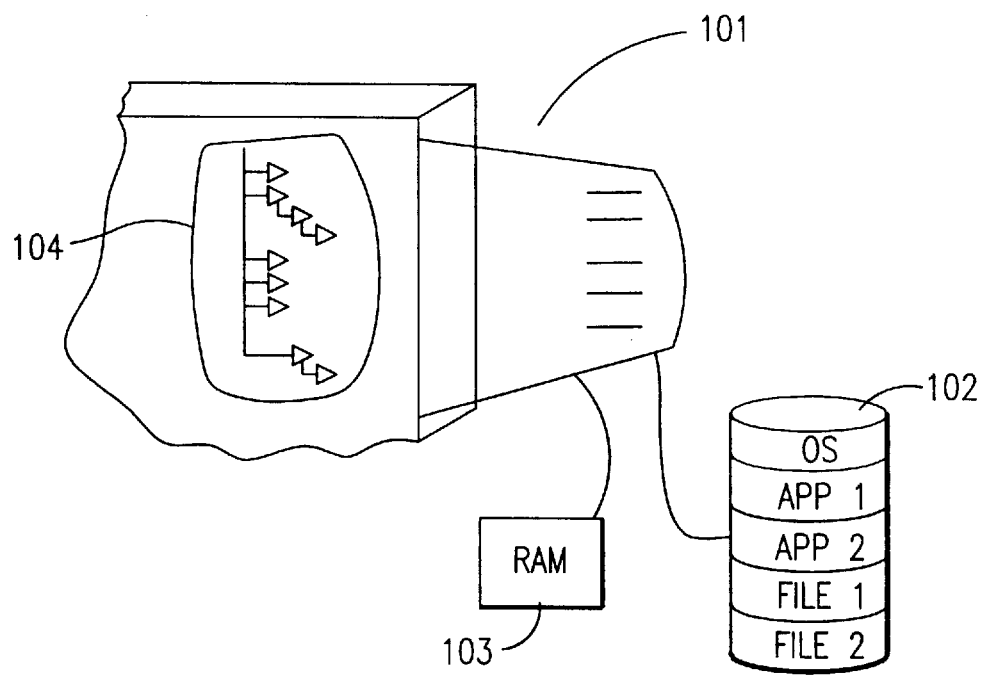
FIG. 10 illustrates a computer system for storing and displaying data structures.

FIG. 9 illustrates another possible view of the same hierarchical information that is depicted in FIG. 8.

Accordingly, the scope of protection of this invention is limited only by the following claims and their equivalents.

We claim:

1. A method for optimizing an amount of information shown on a display, comprising the steps of:
   a) partially displaying a hierarchical data structure, the partial display not including the root node of said hierarchical data structure;
   b) selecting an item of information stored in the hierarchical data structure and visible in said display;
   c) identifying other items of information linked between the item of information and said root node of the hierarchical data structure; and
   d) displaying simultaneously said root of the hierarchical data structure, the item of information, and said other items of information.

2. The method according to claim 1, wherein step d) includes the step of:
   i) removing from the display non-relevant items of the data structure.

3. The method according to claim 2, wherein the item of information stored in the data structure is an item selected from the group consisting of a directory name, a folder name, and a file name.

4. The method according to claim 2, wherein step b) includes the user implemented step of:
   ii) pointing at the item of information with a pointing device.

5. A method of partially displaying a nodal hierarchy in a single display area, comprising the steps of:
   a) partially displaying in the single display area a nodal hierarchy, the partial display not including the root node of said nodal hierarchy;
   b) selecting a node from the hierarchy;
   c) identifying parents and ancestors of the selected node; and
   d) displaying the selected node and all said parents and ancestors, including said root node, of the selected node in the single display area.

6. The method according to claim 5, wherein step d) includes the step of:
   i) removing from the single display area nodes unrelated to the selected node.

7. The method according to claim 6, wherein step b) includes the user implemented step of:
   ii) pointing at the node with a pointing device.

8. The method according to claim 6, wherein step b) includes the user implemented step of:
   ii) highlighting the node.

9. A method of rearranging a partially displayed data structure having a hierarchy of nodes, comprising the steps of:
   a) displaying a portion of the hierarchy of nodes, said portion not including the root node of said hierarchy;
   b) selecting at least one node from the displayed portion of said hierarchy of nodes;
   c) finding undisplayed parent and ancestor nodes, if any, of said at least one node; and
   d) simultaneously displaying said at least one node and said parent and ancestor nodes of said at least one node by selectively removing from said portion sibling nodes of said parent and ancestor nodes.

10. The method according to claim 9, wherein step b) includes the user implemented step of:

i) pointing at said at least one node with a pointing device.

11. The method according to claim 10, wherein step d) includes the step of:

ii) not displaying at least one other node unrelated to said at least one node.

12. The method according to claim 9, wherein step d) includes the step of:

i) simultaneously displaying said at least one node and said parent and ancestor nodes of said at least one node in a list fashion.

13. A program storage device readable by machine, tangibly embodying a program of instructions executable by the machine to perform method steps for maximizing an amount of information displayed on a computer monitor, said method steps comprising:

a) partially displaying a data structures the partial display not including the root node of said data structure;

b) selecting an item of information stored in the data structure;

c) identifying other items of information linked between the item of information and said root node of the data structure; and d) displaying simultaneously said root node of the data structure, said item of information, and said other items of information by selectively removing from said partial display siblings of said other items of information.

14. An article of manufacture for use in a computer system having an operating system for optimizing an amount of information shown on a display, said article of manufacture comprising a computer usable medium having computer readable program code means embodied in said medium, said program code means including:

computer readable program code means embodied in said computer usable medium for causing a computer to effect the following steps:

a) partially displaying in the single display area a nodal hierarchy, the partial display not including the root node of said hierarchy;

b) selecting a node from the hierarchy;

c) identifying parents and ancestors of the selected node; and d) displaying the selected node and the parents and ancestors of the selected node in the single display area by selectively removing from said partial display siblings of said parents and ancestors of the selected node.

15. A method for operating a computing apparatus to rearrange nodes of an information hierarchy within a single display area insufficient in size to display the complete hierarchy of nodes between the root node of said hierarchy and a selected descendent node such that the lineage of displayed nodes is shown from said selected descendent node up through said root node of the hierarchy, comprising the steps of:

preparing for display a portion of said hierarchy of nodes, the display portion not including said root node;

selecting a descendent node from said hierarchy of nodes, identifying parent and ancestor nodes of descendent node, and displaying said descendent node together with said root node and said parent and ancestor nodes in the single display area by selectively removing from said display siblings of said parents and ancestors of the selected node.

* * * * *